US010019373B2

(12) United States Patent
Ju et al.

(10) Patent No.: US 10,019,373 B2
(45) Date of Patent: Jul. 10, 2018

(54) MEMORY MANAGEMENT METHOD FOR SUPPORTING SHARED VIRTUAL MEMORIES WITH HYBRID PAGE TABLE UTILIZATION AND RELATED MACHINE READABLE MEDIUM

(71) Applicant: MEDIATEK INC., Hsin-Chu (TW)

(72) Inventors: Dz-Ching Ju, Saratoga, CA (US); Meng-Bing Yu, San Jose, CA (US); Yun-Ching Li, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 255 days.

(21) Appl. No.: 14/833,139

(22) Filed: Aug. 23, 2015

(65) Prior Publication Data
US 2016/0179686 A1    Jun. 23, 2016

Related U.S. Application Data

(60) Provisional application No. 62/094,083, filed on Dec. 19, 2014.

(51) Int. Cl.
| | |
|---|---|
| *G06F 12/00* | (2006.01) |
| *G06F 12/0877* | (2016.01) |
| *G06F 3/06* | (2006.01) |
| *G06F 12/06* | (2006.01) |
| *G06F 9/50* | (2006.01) |

(52) U.S. Cl.
CPC ........ *G06F 12/0877* (2013.01); *G06F 3/0604* (2013.01); *G06F 3/0631* (2013.01); *G06F 3/0664* (2013.01); *G06F 3/0683* (2013.01); *G06F 9/50* (2013.01); *G06F 12/0646* (2013.01); *G06F 2212/151* (2013.01); *G06F 2212/603* (2013.01); *G06F 2212/604* (2013.01)

(58) Field of Classification Search
CPC .. G06F 12/0877; G06F 3/0604; G06F 3/0631; G06F 3/0664; G06F 3/0683; G06F 9/50; G06F 12/0646
See application file for complete search history.

(56) References Cited

U.S. PATENT DOCUMENTS

| | | |
|---|---|---|
| 2006/0259734 A1 | 11/2006 | Sheu |
| 2014/0049551 A1 | 2/2014 | Rao |

FOREIGN PATENT DOCUMENTS

| | | |
|---|---|---|
| CN | 102103567 A | 6/2011 |

OTHER PUBLICATIONS

"International Search Report" dated Dec. 21, 2015 for International application No. PCT/CN2015/090346, International filed: Sep. 23, 2015.

*Primary Examiner* — Matthew Bradley
(74) *Attorney, Agent, or Firm* — Winston Hsu

(57) ABSTRACT

A memory management method includes: checking shared virtual memory (SVM) support ability of at least one device participating in data access of a buffer; referring to a checking result to adaptively select an SVM mode; and allocating the buffer in a physical memory region of a memory device, and configuring the buffer to operate in the selected SVM mode.

18 Claims, 4 Drawing Sheets

MEMORY MANAGEMENT METHOD FOR SUPPORTING SHARED VIRTUAL MEMORIES WITH HYBRID PAGE TABLE UTILIZATION AND RELATED MACHINE READABLE MEDIUM

CROSS REFERENCE TO RELATED APPLICATIONS

This application claims the benefit of U.S. provisional application No. 62/094,083, filed on Dec. 19, 2014 and incorporated herein by reference.

BACKGROUND

The disclosed embodiments of the present invention relate to a memory management scheme, and more particularly, to a memory management method for supporting shared virtual memories with hybrid page table utilization and a related machine readable medium.

In a typical computing system, there may be more than one computing unit. For example, a central processing unit (CPU) and a graphics processing unit (GPU) may be implemented in the same computing system. By offloading a portion of the computational tasks traditionally performed by the CPU to the GPU, the efficiency of the CPU may be increased. In order to offload tasks to the GPU, data may be transferred from the physical memory of the CPU to the physical memory of the GPU. To reduce the data traffic between the physical memories of CPU and GPU, a shared virtual memory technique may be employed for allowing CPU and GPU to access the same buffer mapped to shared virtual memory addresses. In a conventional computing system, only a single page table type is employed for implementing shared virtual memories. However, such a shared virtual memory design lacks flexibility and fails to achieve optimized shared virtual memory performance.

SUMMARY

In accordance with exemplary embodiments of the present invention, a memory management method for supporting shared virtual memories with hybrid page table utilization and a related machine readable medium are proposed.

According to a first aspect of the present invention, an exemplary memory management method is disclosed. The exemplary memory management method includes: checking shared virtual memory (SVM) support ability of at least one device participating in data access of a buffer; referring to a checking result to adaptively select an SVM mode; and allocating the buffer in a physical memory region of a memory device, and configuring the buffer to operate in the selected SVM mode.

According to a second aspect of the present invention, an exemplary memory management method is disclosed. The exemplary memory management method includes: allocating a first buffer in a first physical memory region of a memory device; configuring the first buffer to operate in a first shared virtual memory (SVM) mode; allocating a second buffer in a second physical memory region of the memory device; and configuring the second buffer to operate in a second SVM mode, wherein the second SVM mode is distinct from the first SVM mode.

According to a third aspect of the present invention, an exemplary memory management method is disclosed. The exemplary memory management method includes: allocating a first shared virtual memory (SVM) buffer in a first physical memory region of a memory device; managing a first-type page table used by at least one first device for accessing the first SVM buffer; allocating a second SVM buffer in a second physical memory region of the memory device; and managing a second-type page table used by at least one second device for accessing the second SVM buffer, wherein the second-type page table is distinct from the first-type page table.

According to a fourth aspect of the present invention, an exemplary machine readable medium having a program code stored therein is disclosed. When executed by a processor, the program code instructs the processor to perform following steps: checking shared virtual memory (SVM) support ability of at least one device participating in data access of a buffer; referring to a checking result to adaptively select an SVM mode; and allocating the buffer in a physical memory region of a memory device, and configuring the buffer to operate in the selected SVM mode.

According to a fifth aspect of the present invention, an exemplary machine readable medium having a program code stored therein is disclosed. When executed by a processor, the program code instructs the processor to perform following steps: allocating a first buffer in a first physical memory region of a memory device; configuring the first buffer to operate in a first shared virtual memory (SVM) mode; allocating a second buffer in a second physical memory region of the memory device; and configuring the second buffer to operate in a second SVM mode, wherein the second SVM mode is distinct from the first SVM mode.

According to a sixth aspect of the present invention, an exemplary machine readable medium having a program code stored therein is disclosed. When executed by a processor, the program code instructs the processor to perform following steps: allocating a first shared virtual memory (SVM) buffer in a first physical memory region of a memory device; managing a first-type page table used by at least one first device for accessing the first SVM buffer; allocating a second SVM buffer in a second physical memory region of the memory device; and managing a second-type page table used by at least one second device for accessing the second SVM buffer, wherein the second-type page table is distinct from the first-type page table.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to provide a memory management scheme for supporting shared virtual memories with hybrid page table utilization. In this way, different shared virtual memory (SVM) modes may co-exist in the same computing system. For example, a best SVM mode for an SVM buffer allocated in a physical address region may be selected based on the SVM support ability of devices participating in data access of the SVM buffer. Hence, even though the devices may uses page tables of different types, an SVM system sharing mode and an SVM buffer sharing mode may be employed by the same computing system. Compared to the conventional SVM design, the proposed SVM design is more flexible, thus leading to better SVM usage for devices. Further details of the proposed memory management scheme are described as below.

Figure 1:
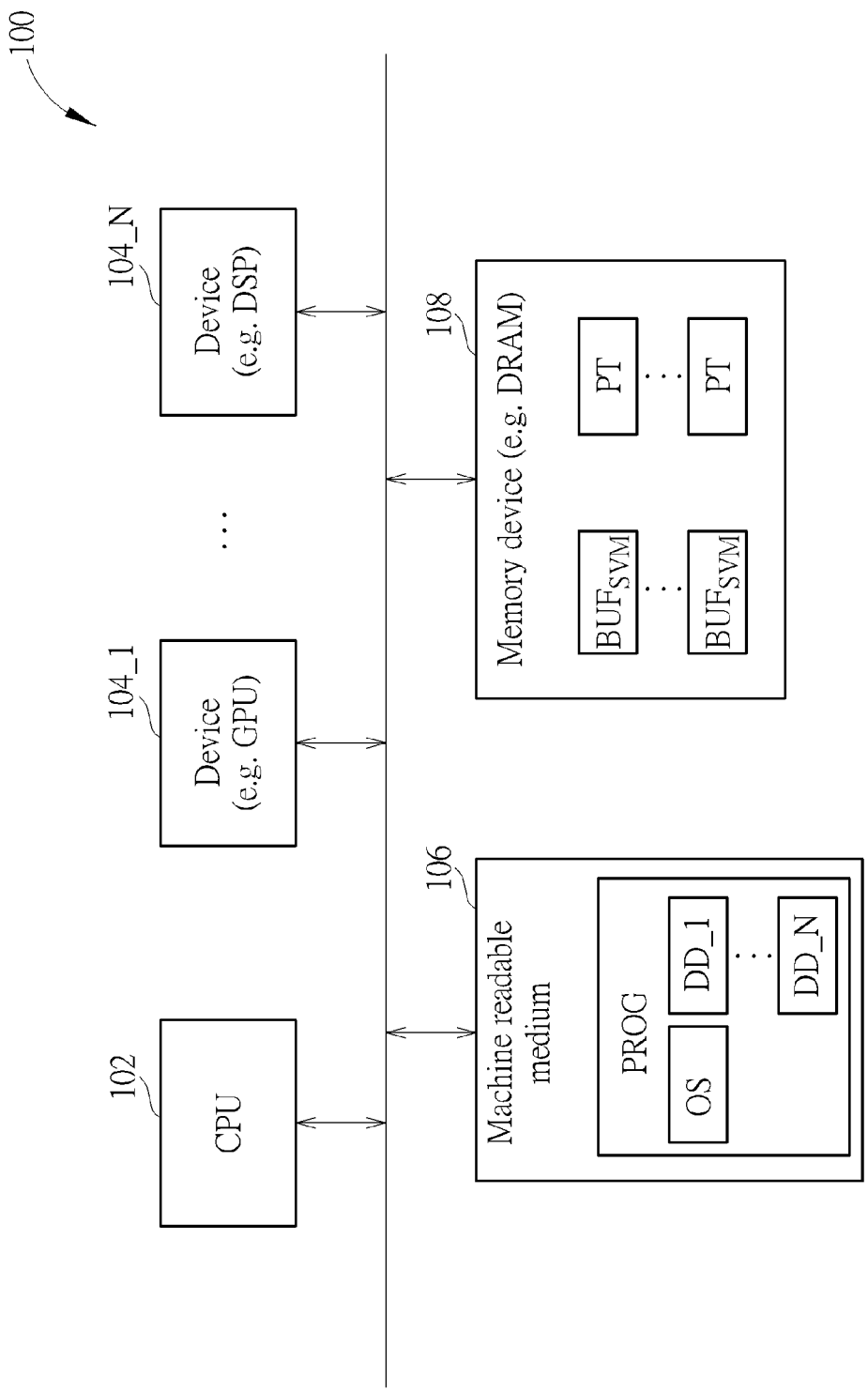
FIG. 1 is a block diagram illustrating a computing system according to an embodiment of the present invention.

FIG. 1 is a block diagram illustrating a computing system according to an embodiment of the present invention. The computing system 100 maybe part of an electronic device, such as a mobile phone, a tablet or a wearable device. The computing system 100 may include a central processing unit (CPU) 102, at least one device (e.g., devices 104_1-104_N), a machine readable medium 106, and a memory device 108. Each of the devices 104_1-104_N may be equipped with computing capability for instruction execution. The computing power of the CPU 102 may be lower than that of the devices 104_1-104_N. For example, concerning certain applications, the computing power of the CPU 102 is lower than that of the devices 104_1-104_N. Hence, by offloading a portion of the computational tasks originally performed by the CPU 102 to at least one of the devices 104_1-104_N, the efficiency of the CPU 102 can be increased. It should be noted that the number of devices 104_1-104_N may be adjusted, depending upon actual design considerations. For example, when the computing system 100 is a heterogeneous computing platform having the CPU 102 and one device, the device maybe a graphics processing unit (GPU) or a digital signal processor (DSP). For another example, when the computing system 100 is a heterogeneous computing platform having the CPU 102 and more than one device, the devices may include at least a graphics processing unit (GPU) and a digital signal processor (DSP). However, these are for illustrative purposes only, and are not meant to be limitations of the present invention.

In this embodiment, the machine readable medium 106 and the memory device 108 may be implemented using separate memory devices. For example, the machine readable medium 106 may be a non-volatile memory such as a flash memory, and the storage device 108 may be a volatile memory such as a dynamic random access memory (DRAM). The machine readable medium 106 is arranged to store a program code PROG. For example, the program code PROG may include an operating system (OS) such as a Linux-based OS and at least one device driver (e.g., DD_1-DD_N) of the at least one device (e.g., devices 104_1-104_N), and may be loaded and executed by the CPU 102 to deal with memory management (particularly, the proposed SVM management method). The memory device 108 is a system memory. Hence, the memory device 108 may have at least one buffer $BUF_{SVM}$ allocated for sharing and may further have at least one page table PT stored therein for virtual-to-physical translation needed by data access of the at least one buffer $BUF_{SVM}$. For example, the memory device 108 may have one CPU page table used by the CPU 102. For another example, the memory device 108 may have at least one device page table (e.g., shadow page table) used by the at least one device 104_1-104_N. The operating system may manage the CPU page table, and may communicate with the at least one device driver for managing the at least one device page table if necessary.

The operating system of the computing system 100 may include a platform run-time layer (e.g., memory manager). When an application running on the CPU 102 needs to create a buffer $BUF_{SVM}$ for sharing, an SVM buffer allocation API (Application Programming Interface) of the application may specify devices that are required to participate in data access of the buffer $BUF_{SVM}$. The default setting of participating devices may be all devices 104_1-104_N implemented in the same computing system 100. Device driver(s) of participating device(s) dynamically specified by the SVM buffer allocation API or directly set by the default setting may report SVM support ability of participating device(s) to the platform run-time layer (e.g., memory manager of OS). Next, the platform run-time layer (e.g., memory manager of OS) refers to the SVM support ability of at least a portion (i.e., part or all) of participating device(s) to adaptively select a SVM mode (particularly, the best SVM mode) for the buffer $BUF_{SVM}$. Hence, the platform run-time layer (e.g., memory manager of OS) allocates the buffer $BUF_{SVM}$ in a physical memory region of the memory device 108, and configures the allocated buffer $BUF_{SVM}$ to operate in the selected SVM mode.

Since the SVM mode is adaptively selected based on participating devices' ability, the platform run-time layer (e.g., memory manager of OS) may select different SVM modes for different buffers $BUF_{SVM}$ needed by the same application or different applications due to the fact that the SVM support ability of participating devices of the different buffers $BUF_{SVM}$ may not be the same. Since a best SVM mode may be selected for each buffer $BUF_{SVM}$, the SVM flexibility/performance on the heterogeneous computing platform can be improved significantly. Further details of the proposed adaptive SVM mode selection is described as below.

The devices 104_1-104_N may support page tables of different types, and may support different SVM modes correspondingly. In a case where a device (e.g., CPU or GPU) supports a shared page table, the device can support multiple SVM modes, including an SVM system sharing mode (which is arranged to share an entire virtual memory address space), an SVM buffer sharing mode requiring pinned memory (which is arranged to share a partial virtual memory address space only), and an SVM buffer mode without requiring pinned memory (which is arranged to share a partial virtual memory address space only). In another case where a device (e.g., CPU or GPU) supports a shadow page table without page fault handling, the device can support only a single SVM mode, i.e., an SVM buffer sharing mode requiring pinned memory (which is arranged to share a partial virtual memory address space only). Without the page fault handling ability, the device has to use pinned memory to share a buffer. As a result, the SVM mode is limited to the SVM buffer sharing mode requiring pinned memory. In yet another case where a device (e.g., CPU or GPU) supports a shadow page table with page fault handling, the device can support two SVM modes, including the SVM system sharing mode (which is arranged to share an entire virtual memory address space) or an SVM buffer sharing mode without requiring pinned memory (which is arranged to share a partial virtual memory address space only). With the page fault handling ability, the device is not required to use pinned memory for sharing a buffer. When a page fault occurs, the operating system and the device driver communicate with each other to update the corresponding shadow page table for the device. Hence, the device can support the SVM system sharing mode and the SVM buffer sharing mode without requiring pinned memory. As a person skilled in the pertinent art can readily understand definition and usage of the shared page table and the shadow page table, further description is omitted here for brevity.

Figure 2:
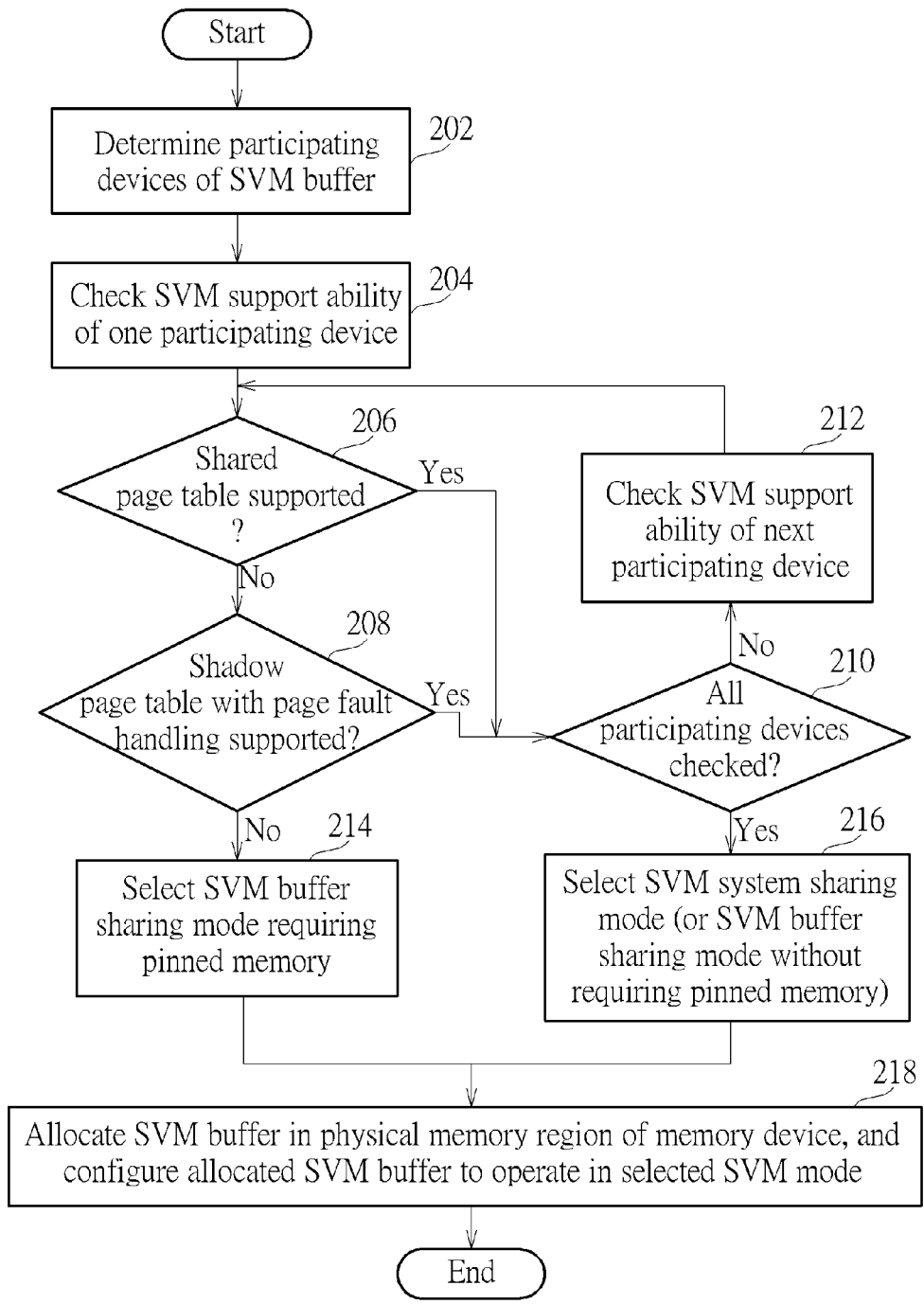
FIG. 2 is flowchart illustrating a decision flow of an SVM mode of an SVM buffer according to an embodiment of the present invention.

FIG. 2 is flowchart illustrating a decision flow of an SVM mode of an SVM buffer according to an embodiment of the present invention. Provided that the result is substantially the same, the steps are not required to be executed in the exact order shown in FIG. 2. In addition, one or more steps can be omitted from or added to the flow shown in FIG. 2. The decision flow may be employed by a platform run-time layer (e.g., memory manager of OS) running on a processor (e.g., CPU 102), and may be briefly summarized as below.

Step 202: Determine devices that are required to participate in the data access of a buffer $BUF_{SVM}$ to be shared.

Step 204: Check the SVM support ability of one participating device.

Step 206: Determine if a shared page table is supported by the participating device. If yes, go to step 210; otherwise, go to step 208.

Step 208: Determine if a shadow page table with page fault handling is supported. If yes, go to step 210; otherwise, go to step 214.

Step 210: Are all participating devices checked? If yes, go to step 216; otherwise, go to step 212.

Step 212: Check the SVM support ability of the next participating device. Go to step 206.

Step 214: Select an SVM buffer sharing mode requiring pinned memory. Go to step 218.

Step 216: Select an SVM system sharing mode (or an SVM buffer sharing mode without requiring pinned memory).

Step 218: Allocate the buffer $BUF_{SVM}$ in a physical memory region of the memory device 108, and configure the allocated buffer $BUF_{SVM}$ to operate in the selected SVM mode.

When an application needs to create a buffer $BUF_{SVM}$ for sharing, an SVM buffer allocation API may specify devices that are required to participate in the data access of the buffer $BUF_{SVM}$ (Step 202). If the SVM buffer allocation API does not specify the participating devices, a default setting may be adopted to select all devices 104_1-104_N as the participating devices (Step 202). Steps 206 and 208 are used to identify the page table type supported by the currently checked participating device. When the currently checked participating device supports a shared page table (step 206), it is determined that any of the SVM system sharing mode, the SVM buffer sharing mode requiring pinned memory and the SVM mode without requiring pinned memory can be supported by the currently checked participating device. When the currently checked participating device does not support a shared page table but supports a shadow page table with page fault handling (step 208), it is determined that any of the SVM system sharing mode and the SVM mode without requiring pinned memory can be supported by the currently checked participating device. When the currently checked participating device does not support a shared page table but supports a shadow page table without page fault handling (step 208), it is determined that only the SVM buffer sharing mode requiring pinned memory can be supported by the currently checked participating device. Since a participating device using a shadow page table without page fault handling fails to support any of the SVM system sharing mode and the SVM buffer sharing mode without requiring pinned memory, the SVM selection of the buffer $BUF_{SVM}$ is constrained by the participating device using a shadow page table without page fault handling. Hence, when the currently checked participating device is found supporting a shadow page table without page fault handling, the SVM mode for the buffer $BUF_{SVM}$ can be directly set as the SVM buffer sharing mode with pinned memory (Step 214).

When the currently checked participating device is found supporting a shared page table or a shadow page table with page fault handling, the next participating device is checked if there is at least one participating device that is not checked yet (Steps 210 and 212). When all of the participating devices have been checked and none of the checked participating devices is found supporting a shadow page table without page fault handling, the SVM mode for the buffer $BUF_{SVM}$ can be set as the SVM system sharing mode (or the SVM buffer sharing mode without requiring pinned memory) (Step 216).

After the SVM mode is determined, the platform run-time layer (e.g., memory manager of OS) may use a "malloc" instruction to allocate the buffer $BUF_{SVM}$ for SVM system sharing, or may use a "SVMalloc" runtime call to allocate the buffer $BUF_{SVM}$ for SVM buffer sharing with/without the use of pinned memory.

In summary, when it is determined that none of the SVM system sharing mode and the SVM buffer sharing mode without requiring pinned memory is selectable after at least one participating device has been checked, the SVM buffer sharing mode requiring pinned memory is selected. However, device(s) supporting the shadow page table without page fault handling may not always participate in the data access of each buffer allocated for sharing. Hence, a buffer allocated for sharing may have the chance of operating in the SVM system sharing mode (or the SVM buffer sharing mode without requiring pinned memory). For example, when it is determined that the SVM system sharing mode is selectable after all of the participating devices have been checked, the SVM system sharing mode can be selected. Compared to the SVM buffer sharing mode requiring pinned memory, the SVM system sharing mode may lead to better SVM performance.

Figure 3:
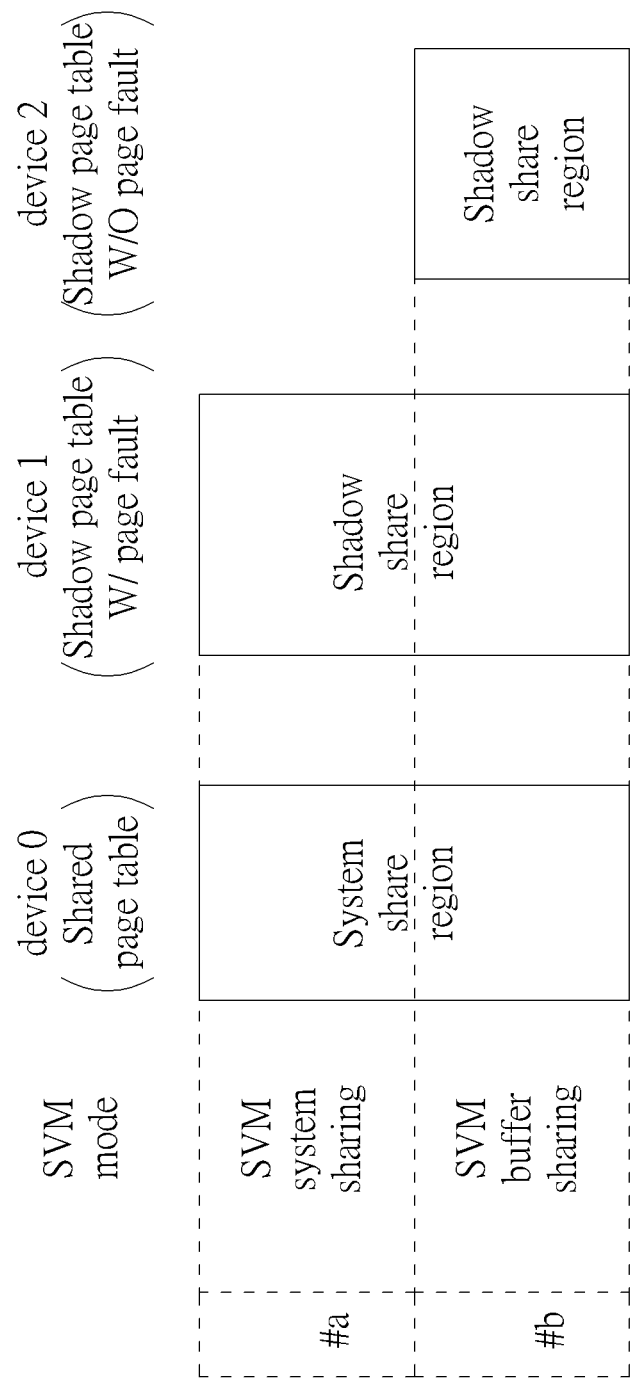
FIG. 3 is a diagram illustrating different SVM buffers operating under different SVM modes according to an embodiment of the present invention.

FIG. 3 is a diagram illustrating different SVM buffers operating under different SVM modes according to an embodiment of the present invention. Suppose that the devices 104_1-104_N shown in FIG. 1 include three devices device0, device1 and device2, where N=3. In this example, device0 and device1 are participating devices of one SVM buffer allocated in the #a physical address region (which may include continuous physical addresses and/or discontinuous physical addresses), and device0, device1 and device2 are participating devices of another SVM buffer allocated in the #b physical address region (which may include continuous physical addresses and/or discontinuous physical addresses). Since device0 uses a shared page table and device1 uses a shadow page table with page fault handling, the SVM buffer allocated in the #a physical address region may be configured to operate in the SVM system sharing mode. Further, since device0 uses a shared page table, device1 uses a shadow page table with page fault handling, and device2 uses a shadow page table without page fault handling, the SVM mode is constrained by the device2's ability. Hence, the SVM buffer allocated in the #b physical address region may be configured to operate in the SVM buffer sharing mode.

In summary, devices using shadow page tables without page fault handling may constrain the SVM mode to the SVM buffer sharing. In this example, the SVM mode of the SVM buffer allocated in the #b physical address region is constrained by device2 using a shadow page table without page fault handling. However, only the SVM buffers that are accessed by at least one device using a shadow page table without page fault handling are limited to the SVM buffer sharing mode. Hence, another SVM buffer may be operated in a different SVM mode for a different combination of devices on the same computing system. In this example, the SVM mode of the SVM buffer allocated in the #a physical address region is allowed to be the SVM system sharing mode. To put it simply, the devices may use page tables of different types, and may access SVM buffers operating under different SVM modes.

Figure 4:
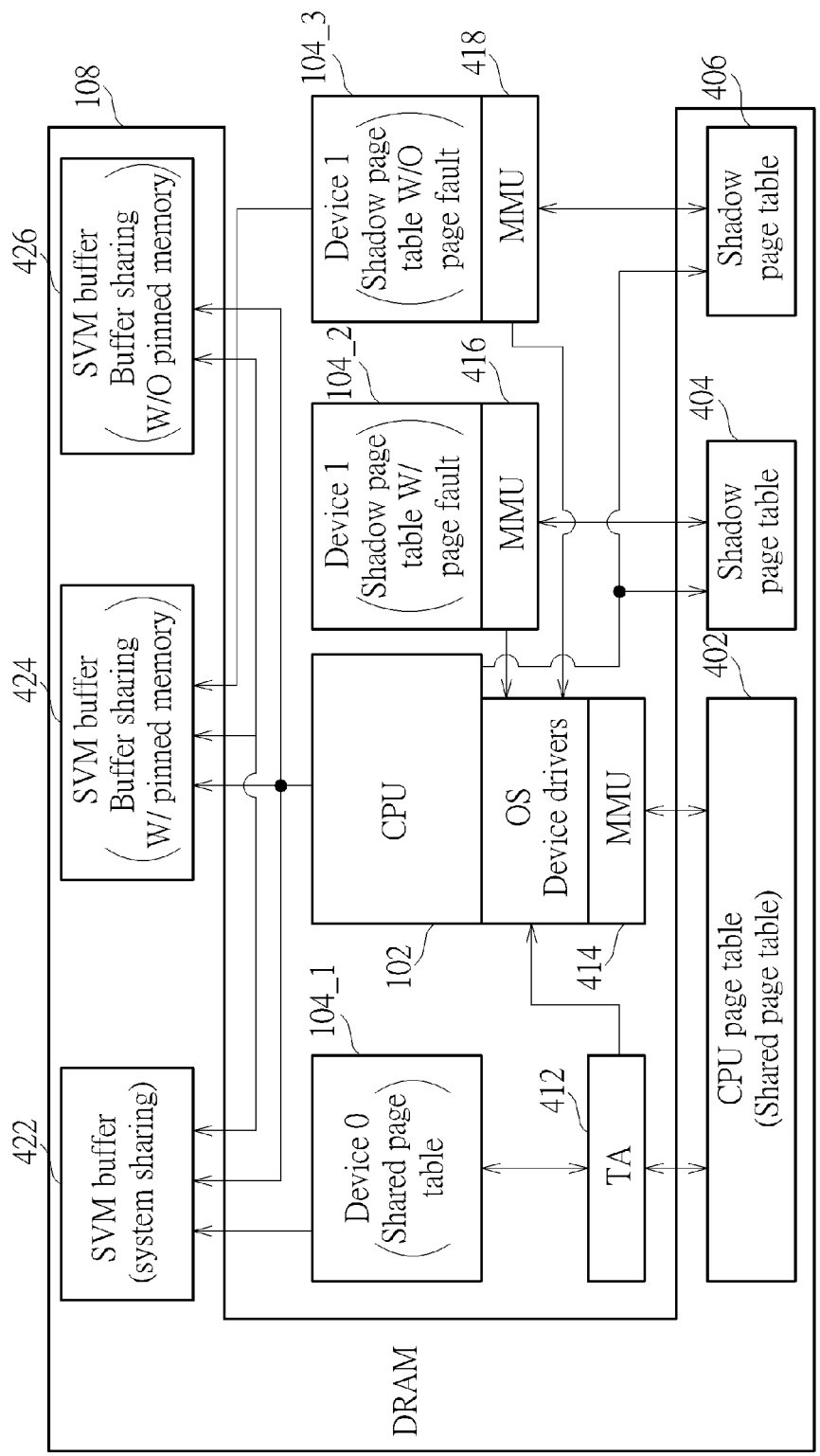
FIG. 4 is a diagram illustrating a system on chip (SOC) that supports shared virtual memories with hybrid page table utilization according to an embodiment of the present invention.

FIG. 4 is a diagram illustrating a system on chip (SOC) that supports shared virtual memories with hybrid page table utilization according to an embodiment of the present invention. Suppose that the memory device 108 is a DRAM, and the devices 104_1-104_N (N=3) include device0, device1 and device2. The device 104_1 uses a shared page table (which is a CPU page table 402 used by CPU 102), the device1 104_2 uses a shadow page table 404 with page fault handling, and the device 104_3 uses a shadow page table 406 without page fault handling. The shared page table (i.e., CPU page table 402) and shadow page tables 404, 406 are managed by the program code including the operating system and the device drivers executed by the CPU 102. Each of CPU 102 and devices 104_2-104_3 has one memory management unit (MMU) 414, 416, 418 used for performing translation of virtual addresses to physical addresses. Since the device 104_1 uses the CPU page table 402, a translation agent (TA) 412 may be used by the device 104_1.

The SVM buffer 422 is accessed by two participating devices (e.g., device 104_1 and device 104_2) and is configured to operate in an SVM system sharing mode. The SVM buffer 424 is accessed by two participating devices (e.g., device 104_2 and device 104_3) and is configured to operate in an SVM buffer sharing mode requiring pinned memory. The SVM buffer 426 is accessed by one participating device (e.g., device 104_2) and is configured to operate in an SVM buffer sharing mode without requiring pinned memory. As can be seen from FIG. 4, the device 104_1-104_3 using page tables of different types co-exist on the same computing system, and the SVM buffers 422-426 operating under different SVM modes co-exist on the same computing system. The proposed virtual memory management scheme allows each address region to select the best SVM mode. Hence, the proposed virtual memory management scheme can support better SVM usage due to improved SVM flexibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory management method comprising:
checking shared virtual memory (SVM) support ability of at least one device participating in data access of a buffer;
referring to a checking result to adaptively select an SVM mode, wherein the selected SVM mode is set by a first SVM mode for a first combination of devices participating in data access of the buffer, the selected SVM mode is set by a second SVM mode for a second combination of devices participating in data access of the buffer, the second combination of devices is distinct from the first combination of devices, and the second SVM mode is distinct from the first SVM mode; and
allocating the buffer in a physical memory region of a memory device, and configuring the buffer to operate in the selected SVM mode.

2. The memory management method of claim 1, wherein referring to the checking result to adaptively select the SVM mode comprises:
when the checking result indicates that each device participating in data access of the buffer supports an SVM system sharing mode, selecting the SVM system sharing mode as the selected SVM mode, wherein the SVM system sharing mode is arranged to share an entire virtual memory address space.

3. The memory management method of claim 2, wherein each device participating in data access of the buffer supports one of a shared page table and a shadow page table with page fault handling.

4. The memory management method of claim 1, wherein referring to the checking result to adaptively select the SVM mode comprises:
when the checking result indicates that each device participating in data access of the buffer supports an SVM buffer sharing mode without requiring pinned memory, selecting the SVM buffer sharing mode without requiring pinned memory as the selected SVM mode, wherein the SVM buffer sharing mode without requiring pinned memory is arranged to share a partial virtual memory address space only.

5. The memory management method of claim 4, wherein each device participating in data access of the buffer supports one of a shared page table and a shadow page table with page fault handling.

6. The memory management method of claim 1, wherein referring to the checking result to adaptively select the SVM mode comprises:
when the checking result indicates that the at least one device only supports an SVM buffer sharing mode requiring pinned memory, selecting the SVM buffer sharing mode requiring pinned memory as the selected SVM mode, wherein the SVM system sharing mode requiring pinned memory is arranged to share a partial virtual memory address space only.

7. The memory management method of claim 6, wherein the at least one device supports a shadow page table without page fault handling.

8. A memory management method comprising:
allocating a first buffer in a first physical memory region of a memory device;
configuring the first buffer to operate in a first shared virtual memory (SVM) mode;
allocating a second buffer in a second physical memory region of the memory device; and configuring the second buffer to operate in a second SVM mode, wherein the second SVM mode is distinct from the first SVM mode;

wherein the first buffer operating in the first SVM mode and the second buffer operating in the second SVM mode co-exist in the memory device.

9. The memory management method of claim 8, wherein the first SVM mode and the second SVM mode are selected from an SVM system sharing mode that is arranged to share an entire virtual memory address space, an SVM buffer mode without requiring pinned memory that is arranged to share a partial virtual memory address space only, and an SVM buffer sharing mode requiring pinned memory that is arranged to share a partial virtual memory address space only.

10. The memory management method of claim 8, wherein the first buffer allocated in the memory device is accessed by at least one first device each supporting the first SVM mode and the second SVM mode, and the second buffer allocated in the memory device is accessed by at least one second device supporting the second SVM mode but not the first SVM mode.

11. The memory management method of claim 8, wherein the first buffer allocated in the memory device is accessed by at least one first device; the second buffer allocated in the memory device is accessed by at least one second device; each of the at least one first device supports one of a shared page table and a shadow page table with page fault handling; and the at least one second device only supports a shadow page table without page fault handling.

12. A memory management method comprising:
allocating a first shared virtual memory (SVM) buffer in a first physical memory region of a memory device;
managing a first-type page table used by at least one first device for accessing the first SVM buffer;
allocating a second SVM buffer in a second physical memory region of the memory device; and
managing a second-type page table used by at least one second device for accessing the second SVM buffer, wherein the second-type page table is distinct from the first-type page table;
wherein said at least one first device using the first-type page table and said at least one second device using the second-type page table co-exist on a same computing system, and none of said at least one first device and said at least one second device is a central processing unit (CPU) of the computing system.

13. The memory management method of claim 12, wherein the first-type page table is a shared page table, and the second-type page table is a shadow page table.

14. The memory management method of claim 12, wherein the at least one first device supports a shared page table, and the at least one second device supports a shadow page table with page fault handling.

15. The memory management method of claim 12, wherein the at least one first device supports a shared page table, and the at least one second device supports a shadow page table without page fault handling.

16. A non-transitory machine readable medium having a program code stored therein, wherein when executed by a processor, the program code instructs the processor to perform following steps:
checking shared virtual memory (SVM) support ability of at least one device participating in data access of a buffer;
referring to a checking result to adaptively select an SVM mode, wherein the selected SVM mode is set by a first SVM mode for a first combination of devices participating in data access of the buffer, the selected SVM mode is set by a second SVM mode for a second combination of devices participating in data access of the buffer, the second combination of devices is distinct from the first combination of devices, and the second SVM mode is distinct from the first SVM mode; and
allocating the buffer in a physical memory region of a memory device, and configuring the buffer to operate in the selected SVM mode.

17. A non-transitory machine readable medium having a program code stored therein, wherein when executed by a processor, the program code instructs the processor to perform following steps:
allocating a first buffer in a first physical memory region of a memory device;
configuring the first buffer to operate in a first shared virtual memory (SVM) mode;
allocating a second buffer in a second physical memory region of the memory device; and
configuring the second buffer to operate in a second SVM mode, wherein the second SVM mode is distinct from the first SVM mode;
wherein the first buffer operating in the first SVM mode and the second buffer operating in the second SVM mode co-exist in the memory device.

18. A non-transitory machine readable medium having a program code stored therein, wherein when executed by a processor, the program code instructs the processor to perform following steps:
allocating a first shared virtual memory (SVM) buffer in a first physical memory region of a memory device;
managing a first-type page table used by at least one first device for accessing the first SVM buffer;
allocating a second SVM buffer in a second physical memory region of the memory device; and
managing a second-type page table used by at least one second device for accessing the second SVM buffer, wherein the second-type page table is distinct from the first-type page table;
wherein said at least one first device using the first-type page table and said at least one second device using the second-type page table co-exist on a same computing system, and none of said at least one first device and said at least one second device is a central processing unit (CPU) of the computing system.

* * * * *